(12) United States Patent
Hoevenaars et al.

(10) Patent No.: US 9,573,486 B2
(45) Date of Patent: Feb. 21, 2017

(54) ELECTRICAL APPARATUS AND METHOD FOR POWERING AN ELECTRICAL MACHINE

(75) Inventors: Erik Hoevenaars, Göteborg (SE); Mats Alakula, Lund (SE)

(73) Assignee: Volvo Lastvagnar AB, Göteborg (SE)

( * ) Notice: Subject to any disclaimer, the term of this patent is extended or adjusted under 35 U.S.C. 154(b) by 150 days.

(21) Appl. No.: 14/405,162

(22) PCT Filed: Jun. 5, 2012

(86) PCT No.: PCT/EP2012/002379
§ 371 (c)(1),
(2), (4) Date: Jun. 24, 2015

(87) PCT Pub. No.: WO2013/182212
PCT Pub. Date: Dec. 12, 2013

(65) Prior Publication Data
US 2015/0306972 A1    Oct. 29, 2015

(51) Int. Cl.
*H02P 1/46* (2006.01)
*B60L 11/18* (2006.01)
(Continued)

(52) U.S. Cl.
CPC ......... *B60L 11/1868* (2013.01); *B60L 11/005* (2013.01); *H02P 4/00* (2013.01);
(Continued)

(58) Field of Classification Search
CPC ......... H02P 4/00; H02P 27/06; B60N 2/0232; B60L 11/005; B60L 11/1851; H02J 7/0054; H02M 3/07
See application file for complete search history.

(56) References Cited

U.S. PATENT DOCUMENTS

| | | |
|---|---|---|
| 2003/0146726 A1 | 8/2003 | Ishikawa et al. |
| 2005/0029890 A1 | 2/2005 | Kadoya et al. |
| 2007/0179695 A1* | 8/2007 | Reinke .......... B60W 10/06 701/54 |

FOREIGN PATENT DOCUMENTS

| | | |
|---|---|---|
| DE | 10 2010 001250 A1 | 7/2011 |
| EP | 1102105 A | 12/2001 |
| EP | 2541755 A | 1/2013 |

OTHER PUBLICATIONS

International Search Report (Feb. 8, 2013) for corresponding International App. PCT/EP2012/002379.
(Continued)

*Primary Examiner* — Karen Masih
(74) *Attorney, Agent, or Firm* — WRB-IP LLP

(57) ABSTRACT

An electrical apparatus for powering an electrical machine with two different energy sources includes an electrical drive system having a battery and a super capacitor, and an electrical machine, wherein the electrical machine includes a rotor, a first separate multi-phase stator winding and a second separate multi-phase stator winding, wherein the drive system includes a first multi-phase bridge inverter connected to the first multi-phase stator winding, and wherein the apparatus further includes a second multi-phase bridge inverter connected to the second multi-phase stator winding and to the battery, where the first multi-phase bridge inverter is connected to a super capacitor, and where the drive system includes a switch adapted to connect and disconnect the DC links of the first multi-phase bridge inverter to and from the second multi-phase bridge inverter. The super capacitor can be used to both deliver and absorb transient power peaks which can prevent the battery from exposure of the power peaks which can improve the battery life.

9 Claims, 2 Drawing Sheets

(51) Int. Cl.
*B60L 11/00* (2006.01)
*H02P 25/22* (2006.01)
*H02P 4/00* (2006.01)
(52) U.S. Cl.
CPC ............. *H02P 25/22* (2013.01); *Y02T 10/642* (2013.01); *Y02T 10/7022* (2013.01)

(56) References Cited

OTHER PUBLICATIONS

International Preliminary Report on Patentability (Sep. 9, 2014) for corresponding International App. PCT/EP2012/002379.

* cited by examiner

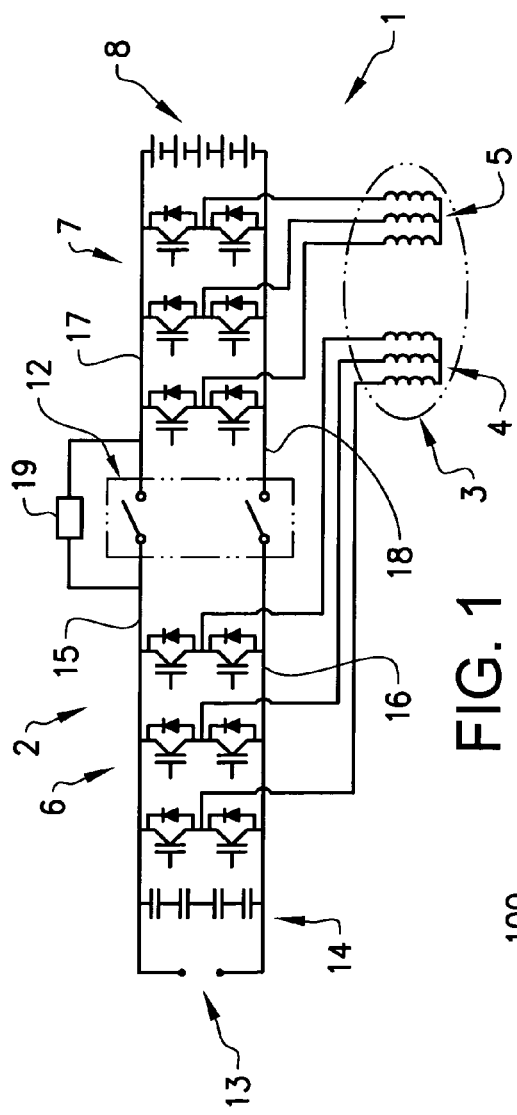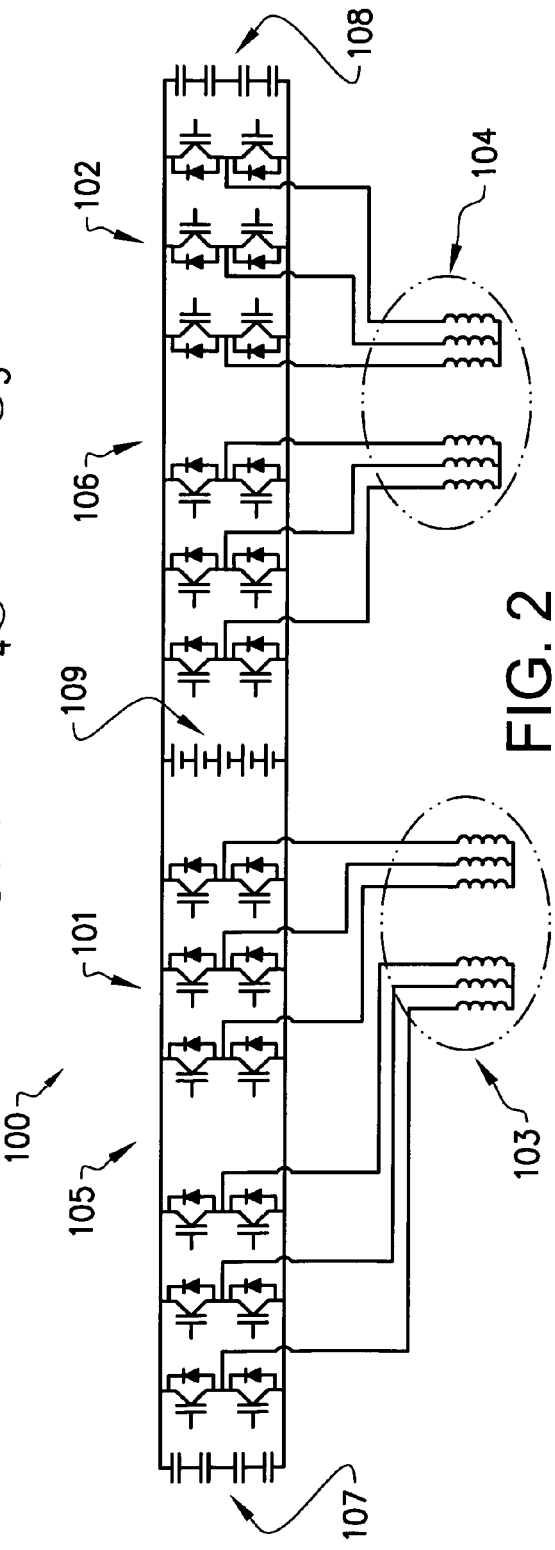

ELECTRICAL APPARATUS AND METHOD FOR POWERING AN ELECTRICAL MACHINE

BACKGROUND AND SUMMARY

The present invention relates to an electrical apparatus for powering an electrical machine and further to a method for powering an electrical machine. The apparatus is suitable for electric vehicles and other machines comprising an electrical machine.

The share of hybrid or full electric vehicles is expected to radically increase in the next 10 to 20 years. A fundamental limitation with such vehicles is the durability of the electrochemical traction batteries. Such batteries do have a limited lifetime, expressed in the number of charging/recharging cycles they may sustain and the Depth Of Discharge (DOD) that these cycles may use. A fully charged battery that is discharged e.g. 10% of its charging capacity and then recharged again may allow repeating this sequence hundreds of thousand times, maybe even millions of times. If the same battery is discharged e.g. 70% of its capacity and then recharged again, the corresponding lifetime may be only a few thousand repetitions. This means that if the DOD is increased 5-10 times, the lifetime is reduced at least 50-100 times, i.e. the total converted energy in a lifetime is reduced about 10 times. Another limitation is related to the average power used related to the energy storage capacity. With increasing power-to-energy ratio the battery lifetime, expressed as number of cycles, is also decreased. This aspect of the battery lifetime is to a large extent related to the use of the battery to provide peak power to the vehicle drive train when accelerating or to absorb peak power from the vehicle drive train when decelerating or braking. A well-known way of taking the burden of peak power off the electrochemical battery is to complement it with additional energy storage, like a flywheel or a Super Capacitor. In that case it is possible to let the Super capacitor deliver the high power peaks at e.g. acceleration (which a Super Capacitor is suitable for) and let the battery take the responsibility for the longer average supply of power and energy, thus limiting the power-to-energy ratio of the battery and extending the battery lifetime.

The energy content of a Super Capacitor has a quadratic dependence of the capacitor voltage. To use the Super Capacitor capacity it is thus required to connect it to the drive system in a way that allows a relatively large voltage variation, e.g. from a maximum voltage down to half the maximum voltage, which would give access to about 75% of the energy storage capacity. This means that some kind of converter arrangement is needed to make this adaption.

Since the Super capacitor is expected to deliver peak power, the power rating of this converter must be equal to the system peak power. This adds cost and complexity to the electric drive system.

There is thus a need for an improved system for powering an electrical machine using two energy sources. One of them is preferably adapted to function as a high power density "burst source" and the other is preferably adapted to function as a high energy density "continuous source".

It is desirable to provide an improved arrangement for powering an electrical machine in a system comprising two different energy sources and an electrical machine having two separate stator windings. It is also desirable to provide an improved method for controlling the power to each winding of an electrical machine, in a system comprising two different energy sources and an electrical machine having two separate stator windings.

In an electrical apparatus for powering an electrical machine from two different energy sources, comprising an electrical drive system having a battery and a super capacitor, and an electrical machine, wherein the electrical machine comprises a rotor, a first separate multi-phase stator winding and a second separate multi-phase stator winding, the drive system comprises a first multi-phase bridge inverter connected to the first multi-phase stator winding, and wherein the apparatus further comprises a second multi-phase bridge inverter connected to the second multi-phase stator winding and to the battery, where the first multi-phase bridge inverter is connected to a super capacitor, and where the drive system comprises a switch adapted to connect and disconnect the first multi-phase bridge inverter to and from the second multi-phase bridge inverter.

By this first embodiment of the electrical apparatus for powering an electrical machine according to the invention, a method for powering an electrical machine having two stator windings with two bridge inverters used for charging the battery is obtained. The electrical machine comprises a rotor and two separate multi-phase stator windings and the drive system comprises two multi-phase bridge inverters, where one multi-phase bridge inverter is connected to one multi-phase stator winding and the super capacitor and where the other multi-phase bridge inverter is connected to the other multi-phase stator winding and to the battery. A switch is arranged between the DC links of the two multi-phase bridge inverters. The switch is adapted to connect and disconnect the DC side of the two multi-phase bridge inverters to and from each other, depending on driving preferences. In this way, the electrical machine cart be powered from either the battery alone or from a combination of the battery and the super capacitor.

In normal driving conditions, the two multi-phase bridge inverters are connected in parallel, powering the two stator windings simultaneously from the battery. In this way, the battery delivers most of the tractive power, and the super capacitor only delivers energy corresponding to smaller changes in the DC link voltage due to charge and load dependent voltage variations of the battery. During transient operations, the first and the second multi-phase bridge inverters are disconnected from each other, such that the first stator winding is powered by the super capacitor through the first multi-phase bridge inverter and the second stator winding is powered by the battery through the second multi-phase bridge inverter. The transient power will be taken with first priority form the Super Capacitor and if that power is not enough the battery will supply additional power requirements. The current delivered by the battery is dependent on the state of charge of the super capacitor. Such a condition is e.g. the acceleration of an electrical vehicle. When the throttle is pressed down, a specific dynamic power is demanded by the drive system. To protect the battery from the high peak power in this instant, as large part of the transient power as possible is provided by the super capacitor. The battery power is ramped up at a rate suitable for the battery and when the transient power peak is over, the battery continues to provide the continuous power flow.

The super capacitor can also be used to absorb transient power during regenerative braking. By disconnecting the first and second multi-phase bridge inverters, the initial transient power generated can be directed to the super capacitor, which will absorb the transient power. If the regenerative braking continuous, the switch may connect the two multi-phase bridge inverters when the voltage of the super capacitor is the same as the voltage of the battery, in order to continue to absorb the more constant charging current. It is also be possible to let the two multi-phase bridge inverters be disconnected and to absorb more regenerative energy in the super capacitor, such that the voltage of the super capacitor is higher than the voltage of the battery. When the vehicle is to accelerate again, i.e. when a transient power is required, the super capacitor will be able to deliver the required power. In driving conditions where a lot of start and stop occurs, such as driving in a town, it may be advantageous to use the two multi-phase bridge inverters in a separated manner most of the time. The use of a super capacitor will reduce the transient power that the battery has to deliver and receive, which helps to prolong the life of the battery. Further, the drivability of an electric vehicle comprising such an electrical system will also improve.

In order to facilitate connecting the battery to the super capacitor when the super capacitor is relatively empty, a connecting device able to limit the current between the battery and the super capacitor may be used to connect the two multi-phase bridge inverters. In this way, the charging current to the super capacitor is limited, thus protecting both the battery and the connecting device.

In the inventive method for powering an electrical machine by using an electrical drive system comprising a first and a second multi-phase bridge inverters, a battery and a super capacitor, wherein the electrical machine comprises a rotor and first and second separate multi-phase stator windings that are magnetically coupled to each other, and where the battery is connected to the second multi-phase bridge inverter and the super capacitor is connected to the first multi-phase bridge inverter, the steps of feeding energy from the battery to the second multi-phase stator winding through the second multi-phase bridge inverter, feeding energy from the super capacitor to the first multi-phase stator winding through the first multi-phase bridge inverter, and connecting or disconnecting the two multi-phase bridge inverters to or from each other with a switch depending on at least one predefined driving condition, such that energy is fed from the battery (8) to the first multi-phase stator winding (4) through the first multi-phase bridge inverter (6) when the two multi-phase bridge inverters are connected, are comprised.

In this method, an electrical machine is powered from one or two different energy sources, depending on the driving conditions. During steady-state operation, the battery powers the electrical machine, and in transient operations, a super capacitor is used in parallel with the battery in order to supply high power peaks to the electrical machine.

BRIEF DESCRIPTION OF DRAWINGS

The invention will be described in greater detail in the following, with reference to the attached drawings, in which FIG. 1 shows a first embodiment of an electrical apparatus according to the invention, FIG. 2 shows an example with two electrical drive systems and two electric machines according to the invention.

DETAILED DESCRIPTION

Figure 3:
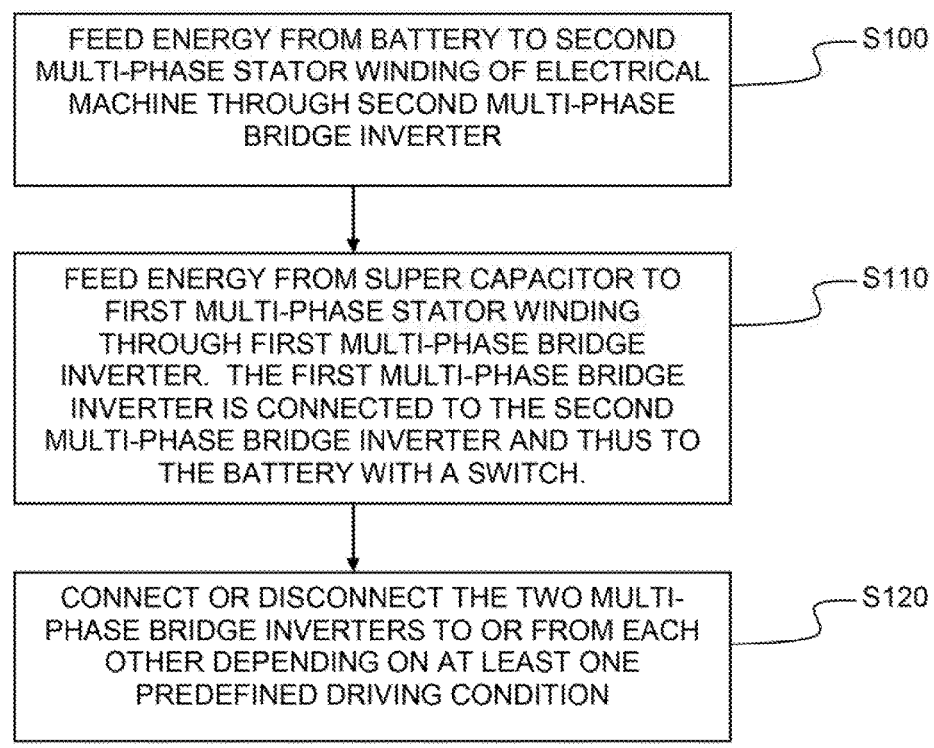
FIG. 3 shows a schematic flow chart of the inventive method.

The embodiments of the invention with further developments described in the following are to be regarded only as examples and are in no way to limit the scope of the protection provided by the patent claims.

FIG. 1 shows an electrical apparatus 1 for powering an electrical machine. In the described example, the electrical apparatus is integrated in an electrical vehicle and the electrical machine is used as a power source for driving the electrical vehicle. The electrical machine may however also be used for other purposes, e.g. to power different rotational equipment such as hydraulic pumps in construction equipment vehicles. The electrical apparatus 1 comprises an electrical drive system 2 and an electrical machine 3.

The electrical machine 3 comprises a rotor (not shown) and at least two separate multi-phase stator windings, a first multi-phase stator winding 4 and a second multi-phase stator winding 5, representing two separate groups of stator windings. The number of phases used in the electrical machine can be selected according to the requirements and on the design of the drive system. A suitable number of phases are e.g. three phases. In the described examples, a three phase system is used. The stator windings are separate from each other but are magnetically and mechanically coupled to each other and are positioned on the same stator of the electric machine.

The electrical drive system 2 comprises a first multi-phase bridge inverter 6 connected to the first multi-phase stator winding 4 and a second multi-phase bridge inverter 7 connected to the second multi-phase stator winding 5. The first multi-phase bridge inverter 6 is connected to a super capacitor which is capable of storing electric energy from either the battery or from regenerative charging. The first multi-phase bridge inverter will have a high potential side 15 and a low potential side 16.

The second multi-phase bridge inverter 7 is connected to the second multi-phase stator winding 5. The second multi-phase bridge inverter 7 is further connected to the battery 8, which is adapted to power the electrical vehicle when driving. The battery may be any suitable battery type. The second multi-phase bridge inverter will have a high potential side 17 and at low potential side 18.

The electrical apparatus also comprises a switch 12 adapted to connect and disconnect the first and the second multi-phase bridge inverters to and from each other. The switch is to be used during driving of the vehicle. When two multi-phase bridge inverters are connected to each other, the low potential sides 16 and 18 will be connected to each other and the high potential sides 15 and 17 will be connected to each other. In this way, both multi-phase bridge inverters can be used to drive the electric machine with energy from the battery during traction of the vehicle. During driving, each multi-phase inverter will thus invert only half of the peak power, which makes it possible to use smaller inverter components, i.e. IGBT modules. The total required silicon area will thus not increase compared to a single inverter drive system rated for equal power and voltage levels.

A super capacitor 14 is connected to the first multi-phase bridge inverter 6. With a super capacitor, the switch 12 can be opened to create two independent power sources, one where the super capacitor powers the first stator winding through the first multi-phase bridge inverter and one where the battery powers the second stator winding through the second multi-phase bridge inverter. Splitting the electric drive system in two halves is useful when transient powers are required by the electrical machine, e.g. when a peak current is to be delivered from the energy storage. One such example is when an electrical vehicle is to accelerate. When the vehicle is driven at constant speed, power is drawn from the battery via the traction motor or via a current limiter (19)

to charge the super capacitor after which the switch is closed and power flows from the battery via both inverters to the electrical machine.

When the throttle of the vehicle is pressed down, in order to accelerate the vehicle, a transient power is needed in order to be able to accelerate the vehicle. A relatively high power peak is thus requested by the electronic control system. A battery, depending on the type, is normally not suitable for supplying high power peaks due to reduced efficiency and lifetime at high power levels. When a desired peak power level exceeds a predefined value, the switch is opened and at least part of the additional amount of energy that is required for acceleration can be delivered by the super capacitor through the first inverter. The super capacitor can deliver a high peak power.

After acceleration, the super capacitor is low in charge. The super capacitor thus needs to be recharged from the battery. One way of doing this is to apply a differential torque, in addition to the traction torque, to the two machine halves in order to create a power flow from the battery via the machine to the super capacitor. In this case, the switch is closed again when the super capacitor voltage corresponds to the battery voltage.

Another way to recharge the super capacitor is to close the switch such that a current can flow from the battery to the super capacitor, thus recharging the super capacitor. If the switch is closed when the voltage of the super capacitor is low, it is necessary to provide the switch 12 with a current limiter 19 in series that connects the high potential sides 15 and 17 of the two multi-phase bridge inverters. The current limiter may be a DC link power controller, e.g. transistors in series with an inductor, and can be used to charge the super capacitor when its voltage is lower than the battery voltage. The super capacitor recharging, process is done by direct energy transfer from the battery via the current limiter to the super capacitor and thus without use of the electrical machine. Charging of the super capacitor should be done with a limited current in order not to damage the battery. One main advantage of current limited direct charging of the super capacitor without use of the electrical machine is the higher efficiency for this charging process compared with super capacitor charging through the electrical machine.

It is also possible to connect the two multi-phase bridge inverters to each other through a current limiter when the voltage of the super capacitor is higher than the voltage of the battery. In this case, the battery will be charged by the super capacitor. This can e.g. be done when the control system of the vehicle foresees that the energy in the super capacitor will not be used to drive the vehicle, or when the super capacitor is charged to a higher degree than required by the drive system.

Another example of when the super capacitor will help to prevent the battery from being exposed to high current peaks is regenerative breaking. If the super capacitor is low in charge, the initial transient regenerative braking energy can be directed to the super capacitor to charge it. If the switch is closed when the regeneration starts, the switch is opened and the super capacitor can absorb the transient braking energy, thus increasing the voltage of the super capacitor. The super capacitor may be charged to the same voltage as the battery, after which the switch is closed such that the regenerated energy will be fed also to the battery. The super capacitor may also be charged to a voltage above the battery voltage. At a subsequent acceleration, the super capacitor is in this case prepared to provide transient accelerating energy, which prevents the battery from absorbing high currents. These power transients, both delivered and absorbed, tend to decrease the battery lifetime. By controlling the switch during transient operation, the super capacitor can thus be used to increase the lifetime of the battery and to improve the transient behavior of the vehicle. The optimal relation between the storage capacities of the super capacitor and the battery will depend on e.g. the cost of the super capacitor, the amount of increased battery lifetime and the expected drive cycle in which the vehicle will operate.

FIG. 2 shows an example of an electrical apparatus 100 comprising two electrical drive systems and two electric machines. In this example, a first electrical drive system 101 powers a first electrical machine 103 and a second electrical drive system 102 powers a second electric machine 104. In the first electrical drive system 101, a first multi-phase bridge inverter is connected to a super capacitor 107 and a second multi-phase bridge inverter is connected to a battery 109. In the second electrical drive system 102, a second multi-phase bridge inverter is connected to a super capacitor 108 and a first multi-phase bridge inverter is connected to the battery 109. During normal driving conditions in a traction mode, the first switch 105 is closed such that it connects the two multi-phase bridge inverters of the first electrical drive system and the second switch 106 is closed such that it connects the two multi-phase bridge inverters of the second electrical drive system. In this way, both electrical machines are powered from the battery through the multi-phase bridge inverters, the first electrical machine through the first electrical drive system and the second electrical machine through the second electrical drive system.

During a transient operation mode, one or both switches are opened depending on the use of the electrical machines. In an electric vehicle where each electrical machine powers one drive wheel each, both switches are opened such that each electrical machine receives peak power from respective super capacitor.

FIG. 3 shows a schematic flow chart of the method for powering an electrical machine by using an electrical apparatus comprising an electrical drive system. The electrical drive system comprises first and second multi-phase bridge inverters, a battery and a super capacitor, and the electrical machine comprises a rotor and first and second separate multi-phase stator windings that are magnetically coupled to each other. The battery is connected to the second multi-phase bridge inverter and the super capacitor is connected to the first multi-phase bridge inverter.

In step 100, energy is fed from the battery to the second multi-phase stator winding of the electrical machine through the second multi-phase bridge inverter In step 110, energy is fed from the super capacitor to the first multi-phase stator winding through the first multi-phase bridge inverter. The first multi-phase bridge inverter is connected to the second multi-phase bridge inverter and thus to the battery with a switch.

In step 120, the two multi-phase bridge inverters are connected or disconnected to or from each other depending on at least one predefined driving condition. In this way, the electrical machine is either powered from only the battery or, during transient conditions when the switch is closed such that the two multi-phase bridge inverters are connected to each other, from both the battery and from the super capacitor. In this way, the driveability of the electrical machine is improved.

The invention is not to be regarded as being limited to the embodiments described above, a number of additional variants and modifications being possible within the scope of the subsequent patent claims.

REFERENCE SIGNS

1: Electrical apparatus
2: Electrical drive system
3: Electrical machine
4: First multi-phase stator winding
5: Second multi-phase stator winding
6: First multi-phase bridge inverter
7: Second multi-phase bridge inverter
8: Battery
9: Line voltage supply
10: Rectifier
11: Line filter
12: Switch
13: Connection means
14: Super capacitor
15: High potential side
16: Low potential side
17: High potential side
18: Low potential side
19: Current limiter
100: Electrical apparatus
101: First electrical drive system
102: Second electrical drive system
103: first electric Machine
104: Second electric machine
105: First switch
106: Second switch
107: First super capacitor
108: Second super capacitor
109: Battery

The invention claimed is:

1. An electrical apparatus for powering an electrical machine with two different energy sources, comprising an electrical drive system having a battery and a super capacitor, and an electrical machine, wherein the electrical machine comprises a rotor, a first separate multi-phase stator winding and a second separate multi-phase stator winding, wherein the drive system comprises a first multi-phase bridge inverter connected to the first multi-phase stator winding and where the capacitor is connected between the high potential side and the low potential side of the first multi-phase bridge inverter, wherein the drive system comprises a second multi-phase bridge inverter connected to the second multi-phase stator winding and where the battery is connected between the high potential side and the low potential side of the second multi-phase bridge inverter, wherein the apparatus further comprises a switch adapted to connect and disconnect the first multi-phase bridge inverter to and from the second multi-phase bridge inverter, where the high potential side of the first multi-phase bridge inverter is connected and disconnected to the high potential side of the second multi-phase bridge inverter and the low potential side of the first multi-phase bridge inverter is connected and disconnected to the low potential side of the second multi-phase bridge inverter,
where the switch is opened at a predefined operation state of the electrical apparatus;
when the drive system powers the electrical machine, such that the electrical machine is powered from the battery by the second multi-phase bridge inverter through the second multi-phase stator winding and that the electrical machine is powered from the super capacitor by the first multi-phase bridge inverter through the first multi-phase stator winding, or:

when the voltage of the super capacitor is lower than the voltage of the battery when the electrical machine is used for regenerative breaking, such that the regenerative braking energy charges the super capacitor to a voltage higher than the voltage of the battery, in order to reduce transient power that the battery has to deliver and receive.

2. An electrical apparatus according to claim 1, wherein the switch is closed such that a high potential side of the first multi-phase bridge inverter is connected to a high potential side of the second multi-phase bridge inverter and a low potential side of the first multi-phase bridge inverter is connected to a low potential side of the second multi-phase bridge inverter when the drive system powers the electric machine from the battery.

3. An electrical apparatus according to claim 1, wherein the predefined operation state is a transient state in which the electrical machine requires an additional amount of energy.

4. An electrical apparatus according to claim 2, wherein the predefined operation state is an acceleration of an electric vehicle.

5. An electrical apparatus according to claim 1, wherein the super capacitor is adapted to be recharged from the battery by applying a differential torque, in addition to the traction torque, to the electrical machine in order to create a power flow from the battery via the electrical machine to the super capacitor.

6. An electrical apparatus according to claim 5, wherein the switch is closed when the voltage of the super capacitor is substantially equal to the voltage of the battery.

7. An electrical apparatus according to claim 1, wherein the electrical apparatus comprises a current limiter adapted to connect the high potential side of the battery to the high potential side of the super capacitor in order to charge or discharge the super capacitor to equalize the voltage of the battery and the super capacitor.

8. An electrical apparatus according to claim 1, wherein the super capacitor is used to power the electrical machine through the first multi-phase stator winding and the battery is used to power the electrical machine through the second multi-phase stator winding when the voltage of the super capacitor is higher than the voltage of the battery.

9. Electrical vehicle, comprising an electrical apparatus according to claim 1.

* * * * *